United States Patent
Xiong et al.

(10) Patent No.: US 10,362,652 B1
(45) Date of Patent: Jul. 23, 2019

(54) LIGHTING DEVICE WITH DIMMING REFERENCE CONTROL METHOD TO STABILIZE LOW OUTPUT CURRENT

(71) Applicant: Universal Lighting Technologies, Inc., Madison, AL (US)

(72) Inventors: Wei Xiong, Madison, AL (US); Scott Price, Madison, AL (US); Danny Pugh, Harvest, AL (US); Candice Ungacta, Huntsville, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/116,076

(22) Filed: Aug. 29, 2018

Related U.S. Application Data

(60) Provisional application No. 62/553,194, filed on Sep. 1, 2017.

(51) Int. Cl.
*H05B 33/08* (2006.01)
*H02M 3/335* (2006.01)

(52) U.S. Cl.
CPC ..... *H05B 33/0851* (2013.01); *H05B 33/0815* (2013.01); *H02M 3/33569* (2013.01)

(58) Field of Classification Search
None
See application file for complete search history.

(56) References Cited

U.S. PATENT DOCUMENTS

| | | | |
|---|---|---|---|
| 8,193,738 B2 | 6/2012 | Chu et al. | |
| 8,269,423 B2 | 9/2012 | Yao et al. | |
| 8,692,475 B2 | 4/2014 | Wang | |
| 9,326,332 B1 | 4/2016 | Melanson | |
| 9,585,210 B2 | 2/2017 | Bandel | |
| 9,730,281 B2 | 8/2017 | Bannister | |
| 2016/0014863 A1 | 1/2016 | Sullivan et al. | |
| 2016/0366742 A1 | 12/2016 | Lee et al. | |
| 2017/0238380 A1 | 8/2017 | Bannister | |
| 2017/0280523 A1 | 9/2017 | Kathiresan et al. | |
| 2018/0054864 A1* | 2/2018 | Yang ................. | H05B 33/0815 |

* cited by examiner

*Primary Examiner* — Jany Richardson
(74) *Attorney, Agent, or Firm* — Patterson Intellectual Property Law, P.C.; Gary L. Montle

(57) ABSTRACT

A lighting device, and method of controlling a power stage thereof, is provided to stabilize operation at low output currents. An output current is sensed as a feedback signal and provided to control circuitry, which further defines upper and lower boundaries for a control band about an average sensed input control value. A reference signal corresponds to the average sensed input control value, wherein adjustments to the reference signal are enabled only when an actual sensed input control value extends beyond the control band. The upper and lower boundaries may be linearly or non-linearly approaching the average control value as a function of increases in the average control value, to prevent control adjustments in particular for low output current conditions. Control signals are generated for driving one or more switching elements in the power stage, based at least in part on the feedback signal and the generated reference signal.

17 Claims, 6 Drawing Sheets

LIGHTING DEVICE WITH DIMMING REFERENCE CONTROL METHOD TO STABILIZE LOW OUTPUT CURRENT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of U.S. Provisional Patent Application No. 62/553,194, filed Sep. 1, 2017, and which is hereby incorporated by reference.

BACKGROUND OF THE INVENTION

The present invention relates generally to lighting devices with dimming control. More particularly, the present invention relates to a light-emitting diode (LED) driver configured to improve low LED current stability by applying an adaptive hysteresis dimming reference control method.

Most LED drivers have a very wide range of output current control capability or very low dimming capability including, for example, a 1.5 A to 1 mA output current range. For certain conventional driver configurations, low-frequency noise or other minor perturbations can cause instability at relatively low dimming output currents, further resulting in flickering that is unacceptable for many LED lighting applications. LED drivers are particularly susceptible to "ripple" noise components that are residual from AC-DC rectification of an AC mains input. While the presence of such ripple components is not substantive at higher output current levels, they can be proportionately significant at lower (dimmed) output levels.

BRIEF SUMMARY OF THE INVENTION

An adaptive hysteresis reference control method as disclosed herein can effectively desensitize LED driver control circuitry to input signal noise and eliminate LED current flickering in low current output situations.

In an embodiment, a lighting device such as for example an LED driver includes a power stage with one or more switching elements, configured to generate an output current to a lighting mode based on a regulated switching operation. Associated control circuitry generates control signals for regulating the switching operation of the power stage based at least in part on a feedback signal regarding the output current and a reference signal. The control circuitry is further configured to define an upper boundary and a lower boundary with respect to a control value corresponding to the reference signal, and to enable adjustments to the reference signal only when changes to the control value exceed the upper boundary or the lower boundary.

In a particular embodiment, the control value comprises a measured average of a sensed dimming control input signal.

In an embodiment, each of the upper boundary and the lower boundary are defined as offset values with respect to the control value, respectively extending linearly from a minimum control value to a maximum control value.

In one exemplary aspect of the aforementioned embodiment, each of the upper boundary and the lower boundary may be defined as constant offset values with respect to the control value, along an entire range between the minimum control value and the maximum control value.

In another exemplary aspect of the aforementioned embodiment, each of the upper boundary and the lower boundary are defined corresponding to a difference between a current control value and the maximum control value. For example, the upper and lower boundaries may linearly and progressively approach the control value as the control value increases.

In another embodiment, each of the upper boundary and the lower boundary are defined as offset values with respect to the control value, respectively extending non-linearly from a minimum control value to a maximum control value. In one exemplary aspect thereof, each of the upper boundary and the lower boundary may be defined corresponding to a difference between a current control value and the maximum control value, further inversely proportional to the current control value, for example wherein the upper and lower boundaries progressively approach the control value as the control value increases.

In another embodiment, the lighting device further includes a filtering circuit comprising a resistor and a capacitor coupled in series to filter high frequency noise in the reference signal.

In an embodiment, the control circuitry comprises a microcontroller configured to receive a dimming control input signal as the control value and to programmatically generate the reference signal based on a stored dimming curve and further based on the upper and lower boundaries, and a comparator configured to receive the feedback signal and the reference signal and to generate the control signals to a gate driving circuit.

In another embodiment, the lighting device further comprises an analog dimming interface circuit coupled to receive a dimming input voltage from an external device, and to generate the dimming control input signal to the microcontroller based thereon.

DETAILED DESCRIPTION OF THE INVENTION

Figure 1:
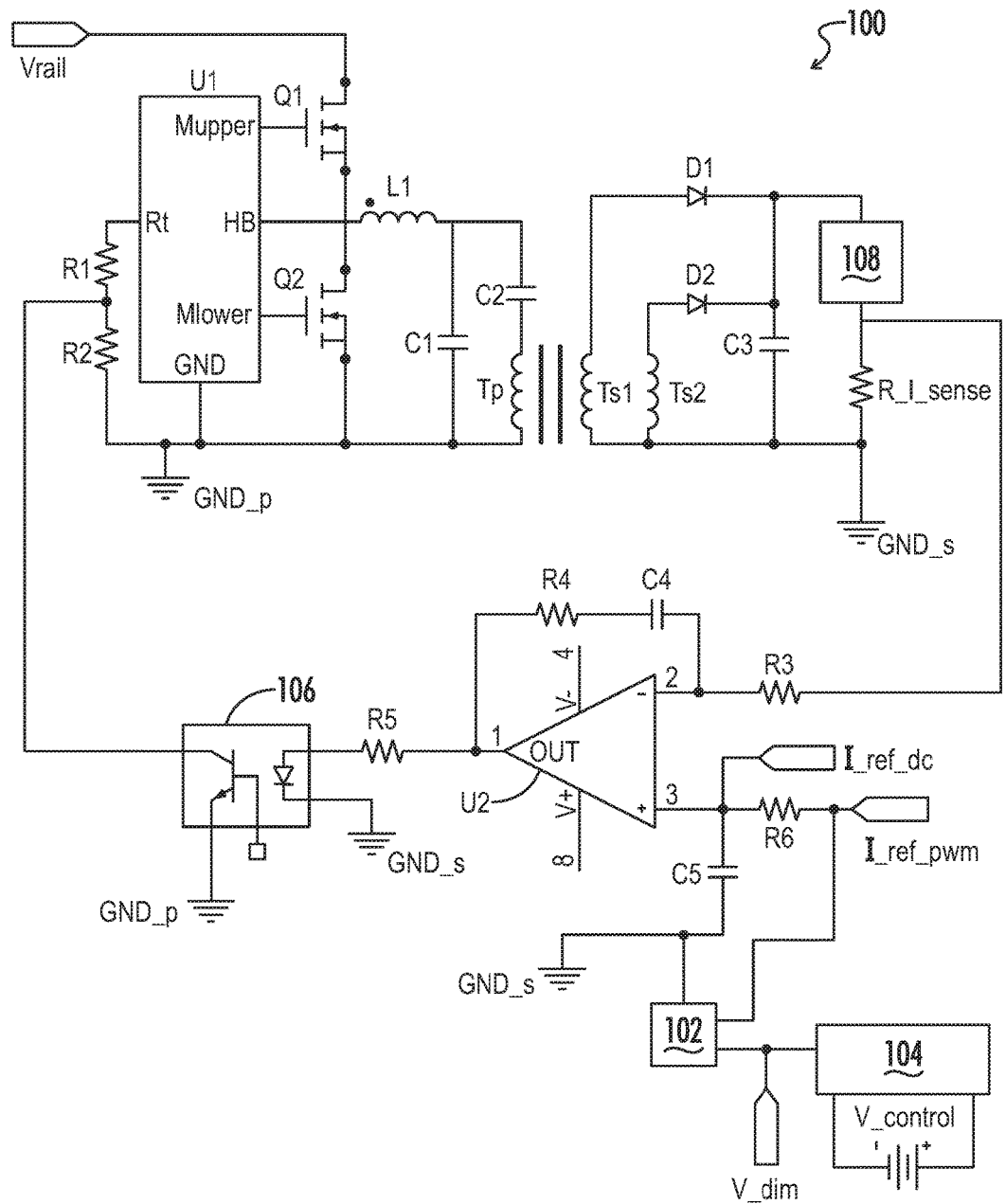
FIG. 1 is a circuit diagram representing an exemplary lighting device as disclosed herein.

Referring generally to FIGS. 1-6, various exemplary embodiments of an invention may now be described in detail. Where the various figures may describe embodiments sharing various common elements and features with other embodiments, similar elements and features are given the same reference numerals and redundant description thereof may be omitted below.

Various embodiments of a hysteresis control method may be disclosed herein by way of reference to an isolated LED driver as illustrated in FIG. 1. Although the LED driver configuration of FIG. 1 will accordingly be described in detail herein, it may be understood that the control method itself may be applied in other circuit configurations unless otherwise explicitly stated.

FIG. 1 illustrates a typical half-bridge resonant type LED driver 100, which provides a constant current output power supply. The illustrated LED driver offers a wide range of output load currents and is stable over the operating range. The LED driver includes a primary circuit side and a secondary circuit side, which are electrically isolated as described below.

The LED driver 100 receives power from an AC source (not shown), e.g., electrical mains. The AC input from the AC source is typically rectified by a full-wave bridge rectifier and may further be modified by a power factor correction (PFC) circuit or the like (not shown). A DC voltage Vrail as illustrated in FIG. 1 may accordingly be a rectifier output alone, as modified by a PFC circuit, or an equivalent DC input.

The LED driver 100 further includes a power stage (e.g., a DC-to-DC converter) that receives the voltage V_rail and generates a DC voltage having a controllable current magnitude as described below. The power stage includes a first switching element Q1 and a second switching element Q2 in a half-bridge switching circuit. The half-bridge switching circuit is connected between the voltage bus V_rail and the primary circuit ground reference GND_p. The drain of the first switching element Q1 is connected to the voltage bus. The source of the first switching element Q1 is connected to the drain of the second switching element Q2 at a common switched node of the half-bridge switching circuit, and the source of the second switching element Q2 is connected to the primary circuit ground reference.

Each of the first and second switching elements Q1, Q2 have a respective control input terminal. The control input terminals are driven by a self-oscillating half-bridge gate drive integrated circuit (IC) U1, such as, for example, an NCP1392B high-voltage half-bridge driver with inbuilt oscillator, which is commercially available from ON Semiconductor Company of Phoenix, Ariz.

The drive IC is responsive to a timing resistance connected to a timing input terminal (RT) 250 to alternately apply an upper drive voltage on an upper drive terminal (M_upper) and apply a lower drive voltage to a lower drive terminal (M_lower). The upper output drive voltage is applied to the control input terminal of the first switching element Q1, and the lower output drive voltage is applied to the control input terminal of the second switching element Q2. A switched signal is produced on the common switch node by the alternate connection of the common switched node to V_rail when the first switching element is turned on and to the ground reference when the second switching element is turned on. The switching frequency of the switched signal is determined by the resistance applied to the timing input terminal, which controls the magnitude of the current flowing out of the timing input terminal. When the resistance applied to the timing input terminal increases, the current flowing out of the timing input terminal decreases, which causes the frequency of the drive voltages applied to the two switching elements to decrease. When the resistance applied to the timing input terminal decreases, the current flowing out of the timing input terminal increases, which causes the frequency of the drive voltages to increase. The drive IC may include other inputs, which are not shown in FIG. 1.

The common switched node of the half-bridge switching circuit is connected to a half-bridge connection terminal (HB) of the drive IC (U1). The common switched node is also connected to a first terminal of a resonant inductor L1 in a resonant circuit. A second terminal of the resonant inductor is connected to a first terminal of a resonant capacitor C1 at an output node in the resonant circuit. A second terminal of the resonant capacitor is connected to the primary circuit ground reference GND_p. The resonant inductor and the resonant capacitor are the main resonant components of the resonant circuit, which is driven by the alternatingly connecting the common switched node to the DC bus via the first switching element and to the primary circuit ground reference via the second switching element.

The output node of the resonant circuit is connected to a first terminal of a DC-blocking capacitor C2. A second terminal of the DC blocking capacitor is connected to a first terminal of a primary winding Tp of an output isolation transformer. A second terminal of the primary winding of the output isolation transformer is connected to the primary circuit ground reference GND_p. The foregoing components operate as a DC-to-AC inverter to produce an AC voltage across the primary winding of the output isolation transformer.

The output isolation transformer includes a first secondary winding Ts1 and a second secondary winding Ts2. The two secondary windings are electrically isolated from the primary winding Tp. As illustrated, the primary winding is on a primary circuit side, and the secondary windings are on a secondary circuit side. The two secondary windings have respective first terminals, which are connected at a center tap. Respective second terminals of the first and second secondary windings are connected to input terminals of a half-bridge rectifier. The half-bridge rectifier comprises a first rectifier diode D1 and a second rectifier diode D2. The second terminal of the first secondary winding Ts1 is connected to the anode of the first rectifier diode D1. The second terminal of the second secondary winding Ts2 is connected to the anode of the second rectifier diode D2. The cathodes of the two rectifier diodes are connected together at an output node of the half-bridge rectifier. The center tap of the first and second secondary windings is connected to a secondary circuit ground reference GND_s. In other embodiments having a single, non-center-tapped secondary winding (not shown), the half-bridge rectifier with the two rectifier diodes may be replaced with a full-bridge rectifier with four rectifier diodes.

The output node of the half-bridge rectifier 320 is connected to a first terminal of an output filter capacitor C3. A second terminal of the output filter capacitor is connected to the secondary circuit ground reference GND_s. A load voltage ($V_{LOAD}$) is developed across the output filter capacitor at the output node of the half-bridge rectifier. The output node of the half-bridge rectifier is also connected to a first terminal of a load 108, which may comprise, for example, one or more light-emitting diodes (LEDs) that emit light when sufficient current passes through the LEDs. A second terminal of the load is connected to a first terminal of a current sensing resistor R_I_sense. A second terminal of the current sensing resistor is connected to the secondary circuit ground reference GND_s. When current flows through the load, the same current flows through the current sensing resistor. Accordingly, a voltage develops on the current sensing terminal that has a magnitude with respect to the secondary circuit ground reference that is proportional to the current flowing through the load. In one embodiment, the current sensing resistor has a resistance of, for example, 0.1 ohm such that the effect of the resistance of the current sensing resistor on the load current is insignificant.

When the drive IC (U1) operates to apply alternating drive voltages to the first switching element Q1 and the second switching element Q2, an AC voltage develops across the resonant capacitor C1. The voltage across the resonant capacitor may include a DC component; however, the DC blocking capacitor C2 transfers only the AC component of the energy stored in the resonant capacitor to the primary winding Tp of the output isolation transformer. The transferred energy is magnetically coupled from the primary winding to the electrically isolated first and second secondary windings Ts1, Ts2. The first and second rectifier diodes D1, D2 in the half-bridge rectifier rectify the AC energy from the secondary windings into DC energy, which is provided on the output node. The DC energy is stored in the output filter capacitor C3 at a voltage determined by the amount of stored energy. Current from the output filter capacitor is provided to the load 108 at a magnitude determined by the voltage on the half-bridge rectifier output node and the resistance of the load.

Because the intensity of the light emitted by the LEDs in the load 108 is dependent on the magnitude of the current flowing through the LEDs, the current is controlled closely. The current sensing resistor R_I_sense senses the current going through the load and develops a voltage proportional to the load current. The voltage representing the sensed current is fed back to a proportional integral (PI) current control loop to provide current regulation. In FIG. 1, the PI current control loop comprises an operational amplifier (OPAMP) U2 having an inverting (−) input terminal, having a non-inverting (+) input terminal, and having an output (OUT) on an output terminal A current sensing node is connected to the inverting input of the operational amplifier via a series resistor R3. A feedback resistor R4 and a feedback capacitor C4 are connected in series between the output terminal of the operational amplifier and the inverting input. A reference voltage having a magnitude corresponding to a reference current (I_ref_DC) is connected to the non-inverting input of the operational amplifier. The reference current may be a variable reference current as further described below to allow the load current to be varied to thereby change the intensity of the light emitted by the LEDs in the load. The operational amplifier is responsive to the relative magnitudes of the reference voltage and the sensed voltage to provide feedback to the drive IC (U1).

An analog dimming control interface 104 receives an external dimming control signal (V_control), which may typically be provided from an external device via first and second wired interface terminals. The analog dimming control interface converts the external dimming control signal to a voltage signal (V_dim) that can be used by a controller 102 for processing.

The controller 102 senses the voltage signal (V_dim) and generates a PWM output signal (I_ref_PWM) according to a dimming curve set by a dimming control algorithm A filtering circuit comprised of series-coupled resistor R6 and capacitor C5 filter out the high frequency component in the PWM output signal and convert the PWM output signal to a DC voltage signal (I_ref_DC) for current control at the PI control loop.

Accordingly, when the external dimming control signal (V_control) changes, the controller 102 will sense a corresponding change in the voltage signal (V_dim) change, and the generated PWM output signal (I_ref_pwm) will change as well as the DC voltage (I_ref_DC) across the filter capacitor C5. When Lref DC changes, the PI loop output will change.

The output of the PI loop output is connected to a first input of a photocoupler 106 (also referred to as an opto-isolator or an optocoupler), which has an internal light generation section (e.g., an LED) coupled to the input of the photocoupler. In the illustrated embodiment, the output voltage from the operational amplifier U2 is applied to the first input via resistor R5. A second input of the photocoupler is connected to secondary ground reference GND_s. The voltage source also provides the supply voltage to the operational amplifier. The internal LED in the light generation section is responsive to a low voltage applied to the first input to generate light, which is propagated internally to the base of a phototransistor in an output section within the same component. The phototransistor is responsive to the generated light to vary the conductivity and thereby to effectively vary the impedance of the phototransistor. The phototransistor has a collector that is connected to a timing current control node. The phototransistor has an emitter that is connected to the primary circuit ground reference GND_p. A first timing resistor R1 is connected from the timing input terminal (RT) of the drive IC (U1) to the timing current control node, and a second timing resistor R2 is connected from the timing current control node to the primary circuit ground reference. As illustrated the photocoupler electrically isolates the secondary circuit voltages and the secondary circuit ground reference in the secondary circuit side from the components in the primary circuit side.

When the current through the diode sensor of the photocoupler 106 changes, the impedance of the emitter of the photocoupler changes, effectively changing the total output impedance of the timing input (RT) terminal. The gate drive IC (U1) adjusts the gate drive frequency according to the output current of the timing input terminal.

The illustrated drive IC (U1) has a fixed dead-time between turning off one of the switched outputs and turning on the other of the switched outputs. The fixed dead-time causes the duty cycle of the on-time of each of the first and second switches 212, 214 to decrease with increased frequency and to increase with decreased frequency. A decrease in duty cycle causes the energy transferred to the load to decrease. An increase in duty cycle causes the energy transferred to the load to increase. Thus, the load current decreases with increased switching frequency, and the load current increases with decreased switching frequency.

From the foregoing, it can be seen that when the load current through the current sensing resistor R_I_sense generates a voltage that is less than the voltage corresponding to the reference current (I_ref_DC), the output voltage of the operational amplifier U2 increases. The increased output voltage produced by the operational amplifier causes the photocoupler 106 to decrease the light generated between the input section and the output section, which causes the photoresistor in the output section to decrease conductivity and thus increase the effective impedance on the input to the timing input (RT) terminal. The increased effective impedance decreases the current flowing out of the timing input terminal. The decreased current decreases the switching frequency of the drive IC (U1), which increases the duty cycle of each switching voltage applied to the respective control input terminals of the first switching element Q1 and the second switching element Q2. The increased duty cycle has the effect of increasing the energy transferred to the output filter capacitor C3, which increases the voltage on the output node, which increases the current flowing through the load 108. The load current will increase until the sensed load current is substantially equal to the reference current.

When the current flowing through the load 108 is greater than the reference current, the opposite transitions occur. The voltage on the output of the operational amplifier U2 decreases. The decreased output voltage produced by the operational amplifier causes the photocoupler 106 to increase the light generated between the input section and the output section, which causes the photoresistor in the output section to increase conductivity and thus decrease the effective impedance on the input to the timing input (RT) terminal. The decreased effective impedance increases the current flowing out of the timing input terminal. The increased current increases the switching frequency of the drive IC (U1), which decreases the duty cycle of each switching voltage applied to the respective control input terminals of the first switching element Q1 and the second switching element Q2. The decreased duty cycle has the effect of decreasing the energy transferred to the output filter capacitor C3, which decreases the voltage on the output node, which decreases the current flowing through the load 108. The load current will decrease until the sensed load current is substantially equal to the reference current.

Accordingly, by changing the switching frequency the output current can be controlled according to the current reference (I_ref_DC).

Figure 2:
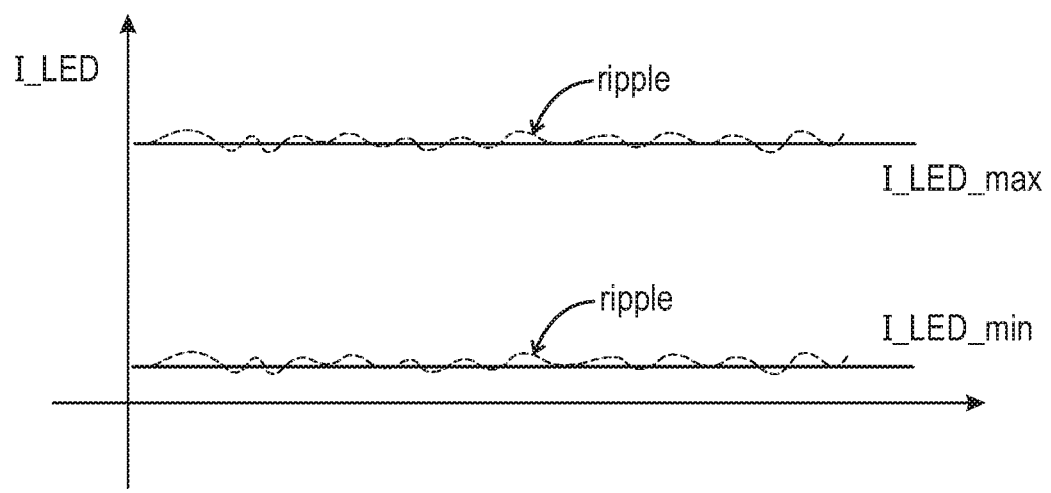
FIG. 2 is a graphical diagram illustrating a practical application of ripple current on top of an LED output current, at each of maximum and minimum levels.

Practically speaking, it may be appreciated that a certain amount of ripple current will always be present alongside the average output LED current (I_LED). As illustrated in FIG. 2, if the same ripple current appears on the maximum LED output current (I_LED_max) and the minimum LED output current (I_LED_min), a flickering of the lighting output may not be visible to the human eye in maximum lighting situations, but flickering of the lighting output will be likely for minimum lighting output situations because the ratio of ripple/noise to output LED current (I_led) is much larger. As flickering is prohibited at any time during operation of an LED driver, it is desirable to stabilize the LED current when it is low.

Figure 3:
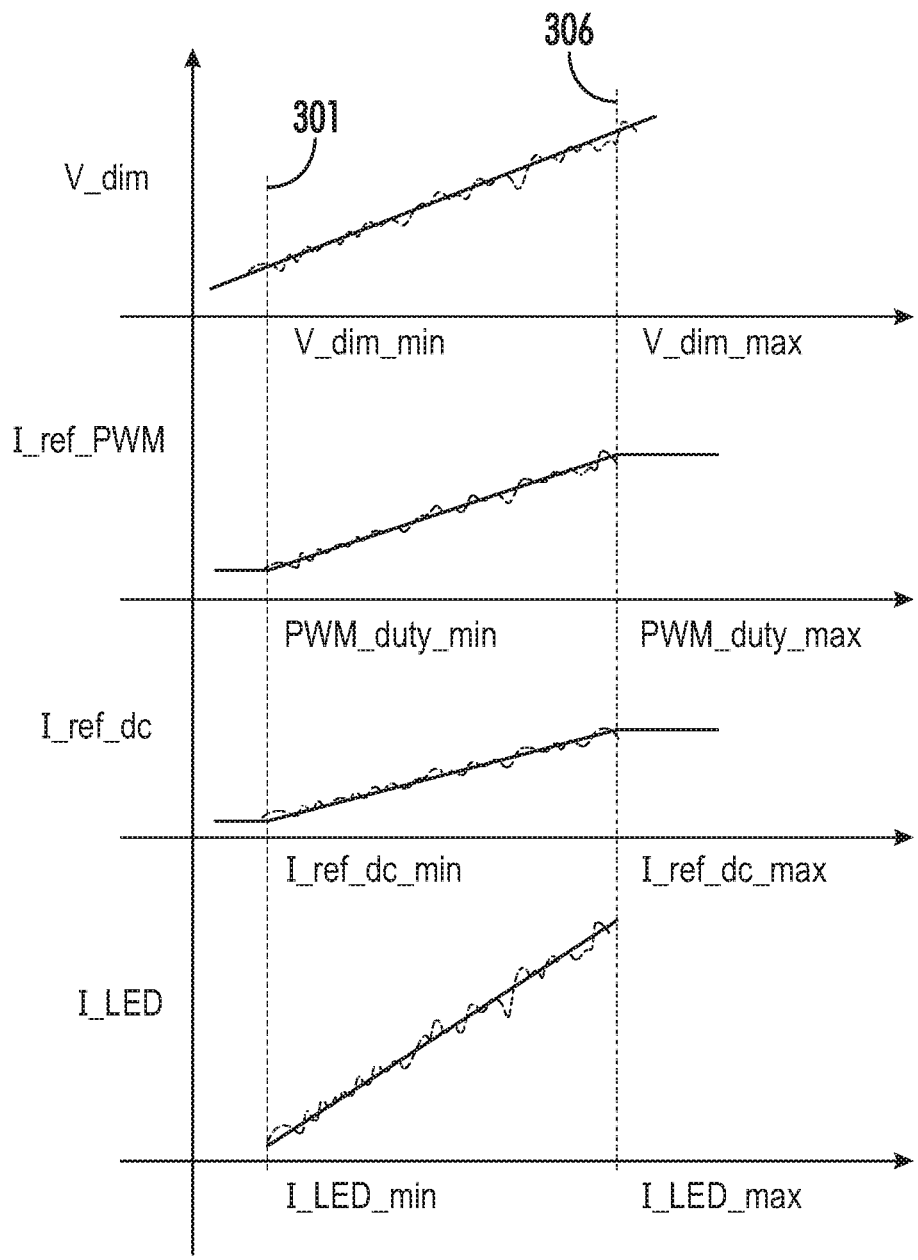
FIG. 3 is a graphical diagram illustrating a practical application of noise with respect to various control signals for the exemplary lighting device of FIG. 1.

Again practically speaking, noise could be present anywhere on internal LED driver signals. Some of the noise on the voltage signal (V_dim) cannot be filtered out and will always be present. The controller 102 senses the voltage signal (V_dim) by performing analog-digital (AD) conversion and translates the voltage signal (V_dim) level into a PWM output signal (I_ref_PWM) with a certain duty ratio. As shown in FIG. 3, an exemplary noise waveform is superimposed on top of control signals corresponding to the voltage signal (V_dim) from the analog dimming control interface 104, the PWM output signal (I_Ref_PWM) from the controller 102, the DC reference (I_ref_DC) provided by high-pass filtering of the PWM output signal, and the output current (I_LED). It is noted that high frequency noise can be easily filtered out by the RC filter (R6, C5), but low frequency cannot. Therefore any changes on the voltage signal (V_dim) as a result of ripple/noise would cause corresponding changes in the PWM output signal (I_ref_PWM), further causing changes in the DC reference (I_ref_dc) and which will finally result in changes to the LED output current (I_LED).

The same amount of instantaneous change to the LED current (I_LED) might not cause any flickering problem when the LED current is high (e.g., approaching I_LED_max), but it will foreseeably cause flickering when the LED current is very low, especially at minimum dimming (I_LED_min).

In an embodiment, a hysteresis control technique can be applied via the controller 102 for noise sensitivity during the AD conversion process. As shown for example in FIG. 4, a hysteresis band is added to the dimming sensing DC conversion process. Referring to the voltage signal (V_dim), a high (upper) limit 402 and a lower limit 403 are defined for changes in the voltage signal (V_dim) extending from a minimum voltage signal 301 to a maximum voltage signal 306. If an instantaneous change in an actual voltage signal (V_dim) is in the hysteresis band limit, the controller 102 will effectively ignore the instantaneous change so that the PWM output signal (I_ref_PWM) will not change in response. As a result, the noise sensitivity of the AD conversion will be dramatically improved.

For example, without a hysteresis band as defined by the upper limit 402 and the lower limit 403, each variation of an otherwise stable average control value (e.g., 401) as a result of noise 408 would result in a corresponding adjustment to the other illustrated values. However, with such a hysteresis band applied to the control loop, it may be shown that adjustments are only made when the control value (401, as further overlaid with noise 408) exceeds either of the upper or lower limits, as represented by the marks 410 with respect to the other signals, e.g., PWM output signal (I_ref_PWM) at points 302, 303, 304, 305. The term "exceeds" is used in the context of a signal that extends beyond the limits of a control band, rather than in the context of a signal that is merely larger than a particular limit (upper or lower) in the control band. Accordingly, a signal that is sensed as being higher than an upper limit or lower than a lower limit would be considered as "exceeding" one of the limits of the hysteresis control band as defined herein, whereas a signal that is sensed as being lower than an upper band and simultaneously higher than a lower band would not be considered as "exceeding" either of the limits of the hysteresis control band as defined herein.

There is a practical drawback for such a hysteresis control having the same upper and lower limits across the full range of the voltage signal (V_dim), in that the applied hysteresis will reduce the dimming interface sensitivity and current control accuracy. For example, if the upper and lower limits 301, 306 of the hysteresis control are set at a constant value of 0.1V offset from an average sensed voltage signal 401, the controller 102 will not respond to any change on the sensed actual voltage signal (V_dim) that is less than 0.1V from the average sensed voltage signal 401. If a change of 0.1V would normally cause a corresponding 10 mA change in the output current (I_LED), each dimming step will be limited at 10 mA per step. Many users of the lighting device will desire very fine dimming accuracy (or current step change) from full current down to 30% of the full current range. However, such a requirement cannot be met if the permissible value for each dimming step will be limited by the hysteresis band limit on AD conversion.

Figure 5:
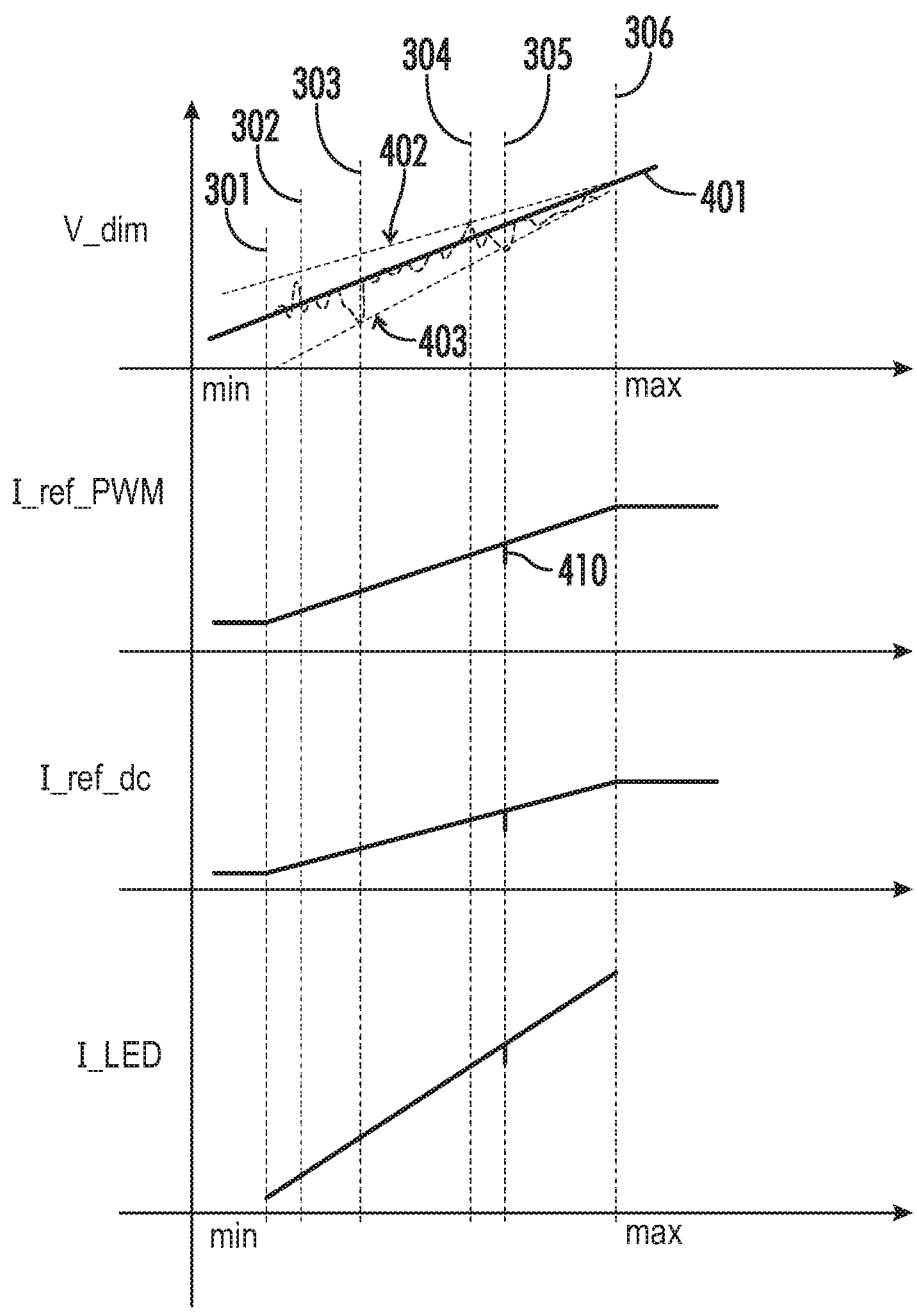
FIG. 5 is a graphical diagram representing an embodiment of a linear adaptive hysteresis control application as described herein with respect to the control signals of FIG. 3.

Referring now to FIG. 5, an embodiment is described for an adaptive hysteresis control method. As previously noted, when the output LED current is high the chance for a certain amount of ripple to cause flickering is relatively low, and otherwise that when the output LED current is low the chance for the same amount of ripple to cause flickering is high. Accordingly, an embodiment of the adaptive hysteresis control method as disclosed herein defines variable hysteresis band limits for the AD conversion to provide a low current step change size at high to medium output current, and a stable PWM output signal (I_ref_PWM) at low output current.

Figure 4:
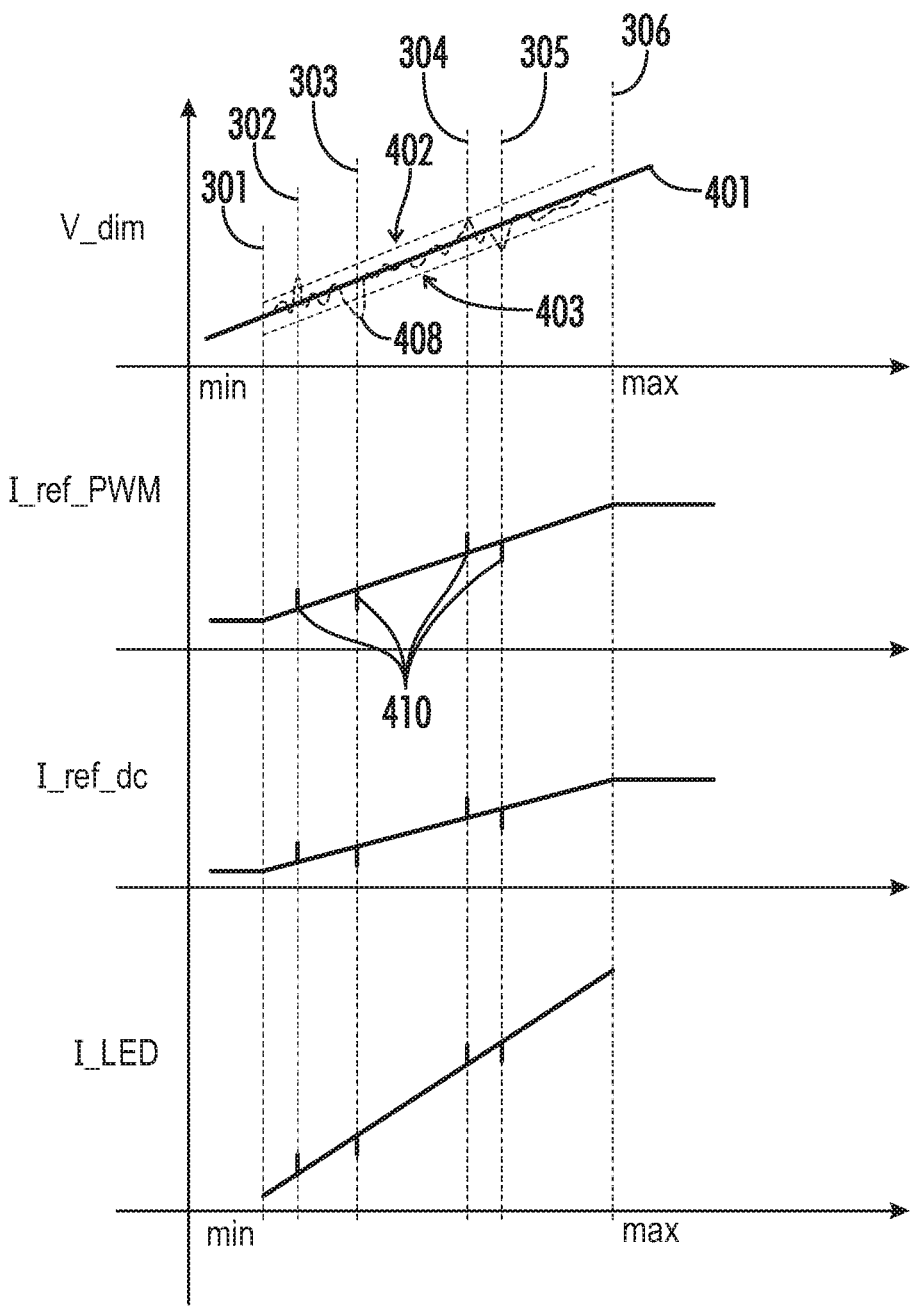
FIG. 4 is a graphical diagram representing an embodiment of a hysteresis control application as described herein with respect to the control signals of FIG. 3.

As shown in FIG. 5, the upper limit line 402 and the lower limit line 403 of hysteresis control (specifically by comparison with the constant offsets represented in FIG. 4) are defined as changing along with increases in the voltage level (V_dim). The changes are still linear, but configured to provide a substantially larger offset band with respect to the voltage level average 401 at a minimum voltage level (V_dim_min) than a smaller offset band at a maximum voltage level (V_dim_max).

In one example, the hysteresis control limit lines may be defined in Equation 1 below as:

$$V_{hy\_limit} = k \cdot (V_{dim} - V_{dim\_max})$$

In the aforementioned Equation 1, K is a constant. As the voltage level (V_dim) or a control value defined by a sensed average thereof 401 approaches the maximum voltage level (V_dim_max) the offset values for the upper limit line 402 and the lower limit line 403 progressively become smaller. Otherwise stated, we can see that when the voltage level (V_dim) is high the hysteresis control dead-band is small, and when the voltage level (V_dim) is low the hysteresis control dead-band is relatively large.

It may be appreciated that by using a large hysteresis limit band we can desensitize AD conversion to the inherent noise when the voltage level (V_dim) is low and effectively stabilize the PWM output signal (I_ref_PWM) and the DC reference signal (I_ref_dc), thereby eliminating the undesirable flickering.

Comparing the graphs in FIG. 5 to those in FIG. 4, the same noise signal 408 is overlaid with the same sensed average 401 for the voltage level (V_dim). However, whereas this noise signal exceeds either of the upper limit 402 or the lower limit 403 on four occasions in FIG. 4 (see, e.g., the marks 410 at locations 302, 303, 304, 305), the noise signal only exceeds the upper or lower limits from the adaptive hysteresis band at a single location 305, and accordingly the remaining control signals (e.g., Lref PWM) are only adjusted at the single location 305.

Further, by using a small hysteresis limit band when the voltage level (V_dim) is high (or output current is high), such an embodiment of an adaptive hysteresis control loop can effectively improve the output current changing accuracy (or changing step).

Figure 6:
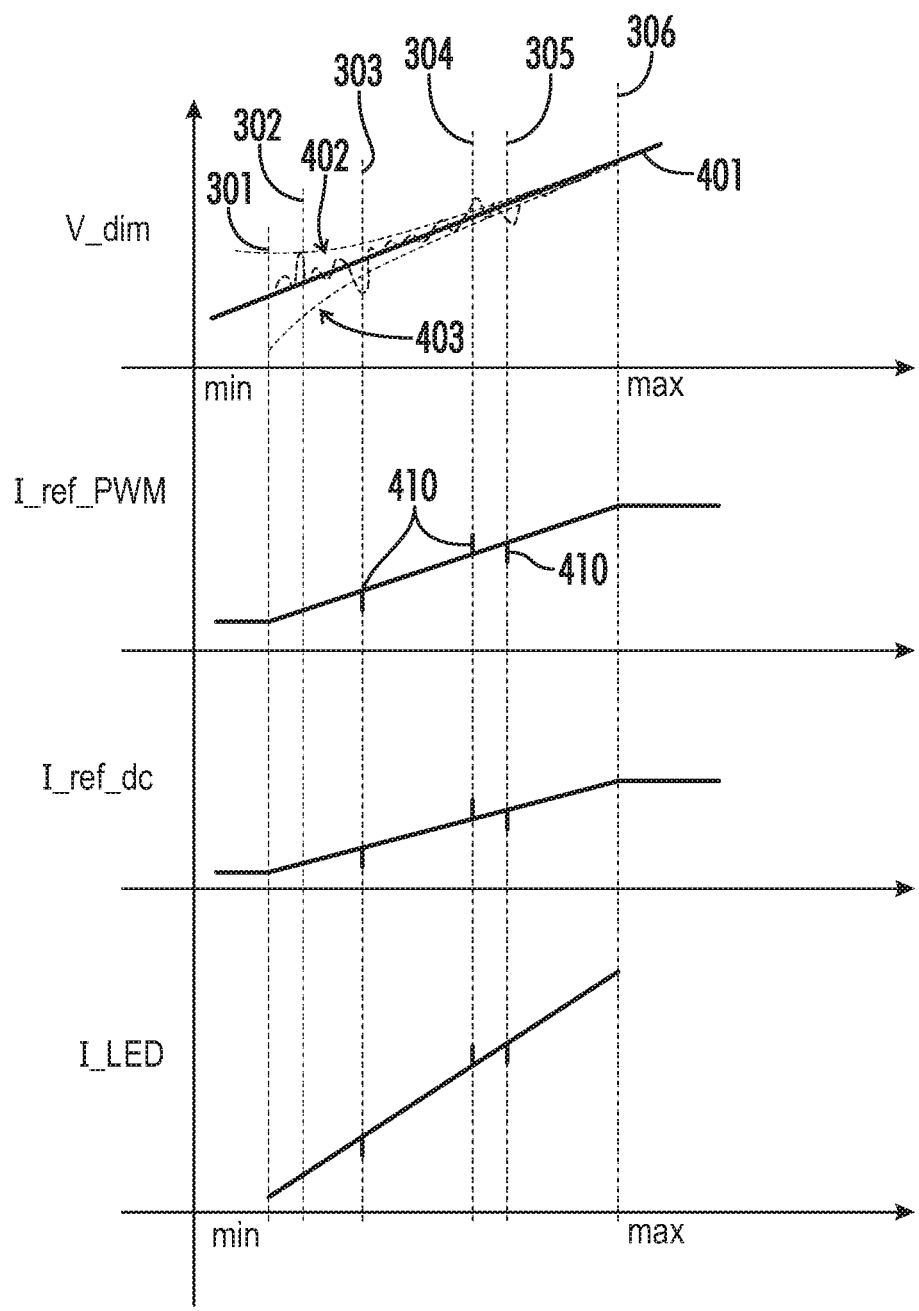
FIG. 6 is a graphical diagram representing an embodiment of a non-linear adaptive hysteresis control application as described herein with respect to the control signals of FIG. 3.

Referring next to FIG. 6, in various alternative embodiments the hysteresis control limit lines can be dynamically modified or alternatively defined to further improve the current change step size when the output current is high and desensitize the ADC when the output current is relatively low. For example, see Equation 2 below:

$$V_{hy\_limit} = \frac{k}{V_{dim}} \cdot (V_{dim} - V_{dim\_max})$$

In the aforementioned Equation 2, K is a constant which may be different from the constant in Equation 1. Here, the upper limit line 402 and the lower limit line 403 will be non-linear and produce a hysteresis control band that is narrow at high to medium output current and very wide at low output current.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct connection between the connected items or an indirect connection through one or more passive or active intermediary devices.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A lighting device comprising:
a power stage comprising one or more switching elements and configured to generate an output current to a lighting mode based on a regulated switching operation; and
control circuitry configured to generate control signals for regulating the switching operation of the power stage based at least in part on a feedback signal regarding the output current and a reference signal,
wherein the control circuitry is further configured
to define each of an upper boundary and a lower boundary as offset values with respect to a measured average control value, the offset values respectively extending linearly from a minimum control value to a maximum control value,
wherein each of the upper boundary and the lower boundary are defined corresponding to a difference between a current control value and the maximum control value, and linearly and progressively approach the control value as the control value increases, and
the control circuitry is further configured to enable adjustments to the reference signal only when changes to the control value exceed the upper boundary or the lower boundary.

2. The lighting device of claim 1, further comprising a filtering circuit comprising a resistor and a capacitor coupled in series to filter high frequency noise in the reference signal.

3. The lighting device of claim 1, wherein the control circuitry comprises
a microcontroller configured to receive a dimming control input signal as the control value and to programmatically generate the reference signal based on a stored dimming curve and further based on the upper and lower boundaries, and
a comparator configured to receive the feedback signal and the reference signal and to generate the control signals to a gate driving circuit.

4. The lighting device of claim 3, further comprising an analog dimming interface circuit coupled to receive a dimming input voltage from an external device, and to generate the dimming control input signal to the microcontroller based thereon.

5. A method of controlling a power stage of a lighting device to stabilize operation at low output current, the method comprising:
sensing an output current from the lighting device as a feedback signal;
defining an upper boundary and a lower boundary for a control band as offset values with respect to an average sensed input control value, respectively extending linearly from a minimum control value to a maximum control value and corresponding to a difference between the actual sensed input control value and the maximum control value, wherein the upper and lower boundaries linearly and progressively approach the average sensed control value as the average sensed control value increases;
generating a reference signal corresponding to the average sensed input control value, wherein adjustments to the reference signal are enabled only when an actual sensed input control value extends beyond the control band; and
generating control signals for driving one or more switching elements in the power stage, based at least in part on the feedback signal and the generated reference signal.

6. The method of claim 5, wherein the average sensed control value comprises a measured average of a dimming control input signal.

7. A lighting device comprising:
a power stage comprising one or more switching elements and configured to generate an output current to a lighting mode based on a regulated switching operation;
control circuitry configured to generate control signals for regulating the switching operation of the power stage based at least in part on a feedback signal regarding the output current and a reference signal,
wherein the control circuitry is further configured to define an upper boundary and a lower boundary as offset values with respect to a measured average control value, respectively extending non-linearly from a minimum control value to a maximum control value,
wherein each of the upper boundary and the lower boundary are defined corresponding to a difference between a current control value and the maximum control value, and progressively approach the control value as the control value increases, and
wherein the control circuitry is further configured to enable adjustments to the reference signal only when changes to the control value exceed the upper boundary or the lower boundary.

8. The lighting device of claim 7, further comprising a filtering circuit comprising a resistor and a capacitor coupled in series to filter high frequency noise in the reference signal.

9. The lighting device of claim 7, wherein the control circuitry comprises
a microcontroller configured to receive a dimming control input signal as the control value and to programmatically generate the reference signal based on a stored dimming curve and further based on the upper and lower boundaries, and
a comparator configured to receive the feedback signal and the reference signal and to generate the control signals to a gate driving circuit.

10. The lighting device of claim 9, further comprising an analog dimming interface circuit coupled to receive a dimming input voltage from an external device, and to generate the dimming control input signal to the microcontroller based thereon.

11. A lighting device comprising:
a power stage comprising one or more switching elements and configured to generate an output current to a lighting mode based on a regulated switching operation;
a controller configured to
receive a dimming control input signal and determine a control value as a measured average thereof,
programmatically generate a reference signal based on a stored dimming curve and further based on upper and lower boundaries defined with respect to the control value, and to enable adjustments to the reference signal only when changes to the control value exceed the upper boundary or the lower boundary; and
a comparator configured to generate control signals to a gate driving circuit for regulating the switching operation of the power stage, the control signals based at least in part on a feedback signal regarding the output current and further based at least in part on the reference signal.

12. The lighting device of claim 11, further comprising an analog dimming interface circuit coupled to receive a dimming input voltage from an external device, and to generate the dimming control input signal to the controller based thereon.

13. The lighting device of claim 11, further comprising a filtering circuit comprising a resistor and a capacitor coupled in series to filter high frequency noise in the reference signal.

14. A method of controlling a power stage of a lighting device to stabilize operation at low output current, the method comprising:
   sensing an output current from the lighting device as a feedback signal;
   defining an upper boundary and a lower boundary for a control band about an average sensed input control value, wherein each of the upper boundary and the lower boundary are defined as offset values with respect to the average sensed control value, respectively extending non-linearly from a minimum control value to a maximum control value;
   generating a reference signal corresponding to the average sensed input control value, wherein adjustments to the reference signal are enabled only when an actual sensed input control value extends beyond the control band; and
   generating control signals for driving one or more switching elements in the power stage, based at least in part on the feedback signal and the generated reference signal.

15. The method of claim 14, wherein each of the upper boundary and the lower boundary are defined corresponding to a difference between an average sensed control value and the maximum control value, further inversely proportional to the average sensed control value.

16. The method of claim 15, wherein the upper and lower boundaries progressively approach the average sensed control value as the average sensed control value increases.

17. The method of claim 14, wherein the average sensed control value comprises a measured average of a dimming control input signal.

* * * * *